United States Patent [19]

Dickinson

[11] Patent Number: 5,238,390

[45] Date of Patent: Aug. 24, 1993

[54] BLOW-MOLDING APPARATUS FOR FABRICATING HOLLOW ARTICLES FROM AN OPEN-ENDED TUBULAR BODY OF THERMOPLASTIC MATERIAL

[75] Inventor: Albert B. Dickinson, Muscle Shoals, Ala.

[73] Assignee: Edward S. Robbins, III, Muscle Shoals, Ala.

[21] Appl. No.: 841,521

[22] Filed: Feb. 26, 1992

Related U.S. Application Data

[62] Division of Ser. No. 600,401, Oct. 19, 1990, Pat. No. 5,112,561.

[51] Int. Cl.[5] .................... B29C 49/04; B29C 49/42
[52] U.S. Cl. .................................................. 425/529
[58] Field of Search ............... 425/525, 529, 530, 535, 425/325, 393; 264/529, 531, 532, 533, 541

[56] References Cited

U.S. PATENT DOCUMENTS

| | | | |
|---|---|---|---|
| 4,518,558 | 5/1985 | Anway et al. | 264/541 |
| 4,952,134 | 8/1990 | Bartley et al. | 425/549 |
| 5,112,561 | 5/1992 | Dickinson | 425/525 |

Primary Examiner—Tim Heitbrink
Attorney, Agent, or Firm—Nixon & Vanderhye

[57] ABSTRACT

Methods and apparatus for blow-molding hollow articles from open-ended tubular bodies of thermoplastics material include dimensionally expanding the open end of the tubular body to accomodate a blow pin plate of preselected dimension and/or geometry. The expanded open end of the tubular member will thus be closed by the blow pin plate. Subsequent introduction of pressurized fluid (e.g., air) into the tubular body through the blow pin plate will cause the tubular body to conform to the female cavity which envelops the same. In such a manner, hollow articles having relatively large sized and/or irregular shaped openings may be fabricated utilizing blow-molding techniques.

17 Claims, 6 Drawing Sheets

BLOW-MOLDING APPARATUS FOR FABRICATING HOLLOW ARTICLES FROM AN OPEN-ENDED TUBULAR BODY OF THERMOPLASTIC MATERIAL

This is a division of application Ser. No. 07/600,401, filed Oct. 19, 1990, now U.S. Pat. No. 5,112,561 issued on May 12, 1992.

FIELD OF THE INVENTION

The present invention relates generally to methods and apparatus for blow-molding plastics articles. More specifically, the present invention relates to methods and apparatus whereby the open end of a parison may be dimensionally expanded so as to accommodate a relatively large-sized blow pin assembly so as to obtain larger-sized and/or irregular shaped openings than what has been possible utilizing conventional blow-molding techniques.

BACKGROUND AND SUMMARY OF THE INVENTION

Blow-molding is a notoriously well known process for forming hollow articles, typically containers for packaging a variety of commercial products in solid or liquid form. Conventional blow-molding techniques (e.g., extrusion or injection blow-molding methods) use a pressurized fluid (typically air or an inert gas such as nitrogen) to expand a hot parison or preform against a female mold cavity. In such a manner, the expanded parison or preform will conform to the shape and configuration of the female mold cavity. Upon cooling of the expanded parison or preform, the mold cavity may be parted and the blow-molded article removed.

Conventional blow-molding methods and apparatus, however, are limited in the type of hollow articles that can be produced. For example, conventional blow-molding methods and apparatus are typically limited to forming hollow articles having relatively small diameter openings (typically no greater than the nominal diameter of the open end of the parison or preform from which the article is made). That is, the physical dimension of the blow pin (which introduces pressurized fluid (e.g., air) into the parison or preform) is typically minimized since it must be of a size that physically penetrates the open end of the parison or preform, and since the mold cavity must be sealed about the its periphery (so as to prevent the escape of pressurized fluid). As a result, the largest effective size of the opening formed in conventional blow-molded articles (i.e., which usually corresponds to the open end of the parison or preform through which the blow pin penetrates) is typically less than the nominal diameter of the parison or preform.

As can be appreciated, there are a number of hollow articles, for example packaging containers for foodstuffs, that have relatively large-sized and/or irregular shaped (non-circular) openings which could be candidates for manufacture by blow-molding processes if a novel blow-molding technique was provided that would allow such large-sized and/or irregular shaped openings to be formed in situ. It is towards providing such novel blow-molding processes and apparatus for performing the same that the present invention is directed.

According to the present invention, novel methods and apparatus are provided whereby a generally tubular body of plastics material having a nominal cross-sectional diameter $D_1$ and an open end which is dimensionally expanded to a significantly greater cross-sectional dimension $D_2$. A blow pin assembly having a desired peripheral surface that corresponds to the dimension and shape of the opening to be formed in the resulting blow-molded article may then be brought into operative association with the dimensionally expanded open end of the tubular body.

The mold cavities are then moved into enveloping relationship with the tubular body so that the open end thereof is sealed against the peripheral surface of the blow pin assembly. Pressurized fluid is then injected into the interior of the tubular body to urge it into conformance with the mold cavity walls while maintaining the open end thereof in its dimensionally expanded state. When cooled, the mold cavities are parted and the blow-molded article removed. In such a manner, blow-molded articles having significantly larger-sized and/or irregularly shaped openings (i.e., corresponding to the dimension and configuration of the peripheral surface of the blow pin assembly) are provided.

In preferred embodiments, the open end of the tubular body is dimensionally expanded using a novel biaxial stretching assembly. In this regard, the stretching assembly of this invention includes a pair of housing blocks moveable between lesser and greater spaced positions relative to one another along a first axial direction. Each of the housing blocks includes a split pin subassembly which includes first and second pin portions. These pin portions are moveable towards and away from one another along a second axial direction (different from, and preferably normal to, the first axial direction) between an initial position (wherein the pin portions are closely adjacent one another) and a final position (wherein the pin portions are separated from one another). The split pin subassemblies are, moreover, movable between an advanced position (wherein the pins extend beyond the housing blocks) and a retracted position (wherein the pins are housed within the housing blocks).

The stretching assembly is then brought into operative position with the open end of the tubular body such that the housing blocks are in their lesser spaced position and with the first and second pin portions in both their initial and extended positions. Thereafter, the housing blocks are moved into their greater spaced position, and the pin portions of each split pin subassembly are moved into their final position so that the open end of the tubular body is biaxially stretched along the firs and second axial directions and is thereby dimensionally expanded (as compared to the nominal diameter of the tubular body).

As described previously, the blow pin assembly may then be moved into the dimensionally expanded tubular body open end. Thus, when the pin portions of the split pin subassemblies are retracted, the tubular body will be draped about the relatively large-sized peripheral surface of the blow pin assembly. The open end of the tubular body is thereby positioned so as to be fluid-sealed against the peripheral surface of the blow pin assembly when the mold cavities are brought into enveloping relationship with the tubular body.

Further aspects and advantages of the present invention will become more clear after careful consideration is given to the following detailed description of the preferred exemplary embodiments therof.

BRIEF DESCRIPTION OF THE DRAWINGS

Reference will be hereinafter made to the accompanying drawings wherein like reference numerals throughout the various FIGURES denote like structural elements, and wherein.

DETAILED DESCRIPTION OF THE DRAWINGS

The present invention may be embodied in a variety of blow-molding systems. For example, the present invention is preferably embodied in either an extrusion blow-molding system which employs an extruded tubular parison to form blow-molded hollow articles. The present invention may also be embodied satisfactorily in an injection blow-molding system which uses an injection molded tubular preform, instead of an extruded parison, to form blow-molded hollow articles therefrom. Thus, as used herein and in the accompanying claims, the terms "parison" and "preform" are intended to refer generically to tubular bodies formed of a plastics material from which blow-molded hollow articles may be fabricated. Such terms are therefore not to be read as limiting the present invention strictly to extrusion and/or injection blow-molding systems.

Figure 1:
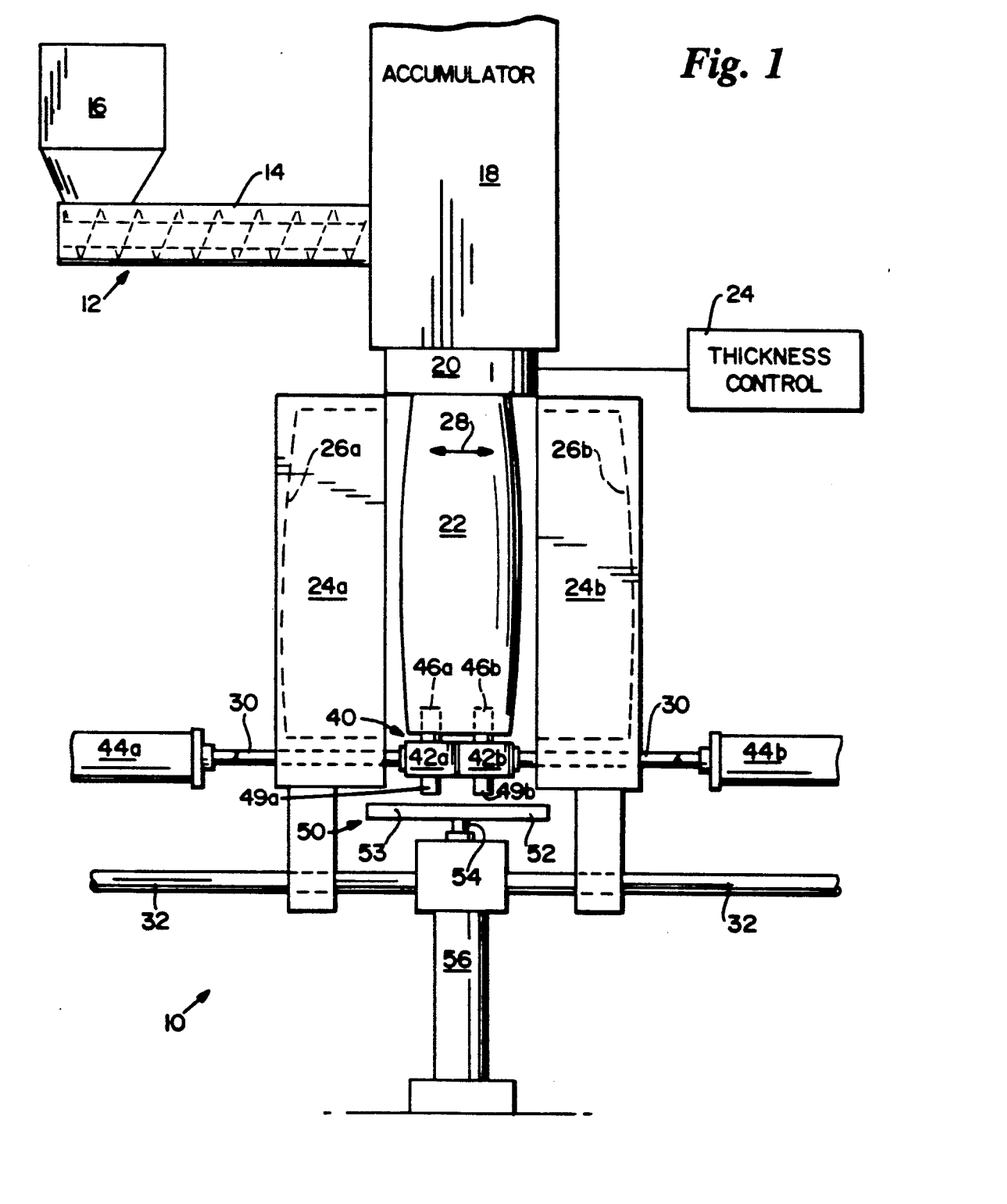
FIG. 1 is a schematic elevation view of a representative blow-molding apparatus according to the present invention.

Preferably, the present invention will be embodied in an extrusion blow-molding system 10 of the variety shown in FIG. 1. As illustrated, the system 10 includes a conventional extruder 12 which thoroughly fluxes the thermoplastic material (typically introduced into the barrel 14 of the extruder 12 in pellet form via hopper 16) and discharges molten thermoplastic material under pressure to an accumulator 18. The accumulator 18, in turn, supplies the molten thermoplastic material to a circular extrusion die head 20. The accumulator 18 is not, however, absolutely necessary. Thus, the molten thermoplastic material could be discharged directly to the extrusion die 20, if desired.

The extruded thermoplastic material is discharged from the die head in the form of an open-ended tubular parison 22. The wall thickness of the parison 22 may controllably be altered (e.g., to form hollow articles having varying wall thickness, and hence different structural characteristics) by means of a thickness controller 24. In this regard, the thickness controller serves to controllably vary the dimension of the circular orifice (not shown) associated with the die 20 in a manner well known per se so as to responsively cause greater/lesser amounts of plastics material to be extruded therefrom.

The parison 22 is typically extruded in a vertically downward direction between a pair of blow mold halves 24a, 24b which define a respective female mold cavity portions 26a, 26b. Although the mold halves 24a, 24b are depicted in FIG. 1 as being symmetrically disposed relative to one another and relative to the parison 22, asymmetric orientations may also be utilized if needed to form particular blow-molded articles. It will be appreciated that the mold halves 24a, 24b may be moved reciprocally towards and away from one another (arrows 28) along guides 30, 32 by any suitable motive means not shown (e.g., electrical, hydraulic and/or pneumatic means) so as to be capable of assuming a parted position (as shown in FIG. 1) and a molding position (whereby the mold halves 24a, 24b envelop the parison 22 such that the mold cavity portions collectively form a complete mold cavity that corresponds to the size and shape of the blow-molded article to be fabrication thereby.

According to the present invention, the blow-molding system 10 is provided with a biaxial stretching assembly 40 and an especially configured blow-pin assembly 50 which will be described in greater detail below in relation to accompanying FIGS. 2A-2E. However, as is evident from FIG. 1, the stretching subassembly includes a pair of housing blocks 42a, 42b which are movable along guides 30 in axial directions parallel to the directions identified by arrows 28. Preferably, hydraulic cylinder means 44a, 44b are employed to move the housing blocks 42a, 42b, respectively, but other suitable electric and/or pneumatic means may be employed for such purposes.

The housing blocks 42a, 42b include a respective split pin assembly 46a, 46b (each of which is shown in FIG. 1 in an extended position thereof). Although not specifically shown in the accompanying drawings, the mold halves 24a, 24b are each provided with recesses so as to accomodate the housing blocks 42a, 42b and their associated split pin assemblies 46a, 46b when the housing blocks and/or split pin assemblies are moved during use.

The blow pin assembly 50 generally includes a relatively large-sized plate 52 which defines a peripheral edge surface 53 of desired dimension and geometry (e.g., in the embodiment depicted, the plate 52 just happens to have a rectangular geometry, but other noncircular geometries are possible). The plate 52 is coupled to a tubular shaft 54 that is reciprocally movable between raised and lowered positions by means of a hydraulic cylinder 56 (or other equivalent electrical and/or pneumatic motive means). The hollow shaft 54 is in fluid communication with a fluid (e.g., air) under pressure and is discharged from the blow pin plate 52 through discharge opening 58 (see FIGS. 2A-2E). In such a manner, a pressurized fluid is capable of being introduced into the parison 22 so as to expand the same against the female mold cavities 26a, 26b during the blow-molding operation.

Accompanying FIGS. 2A-2E illustrate the sequence of the blow-molding operation according to the present invention. For purposes of clarity, accompanying FIGS. 2A-2E are illustrated in the absence of the mold halves 24a, 24b. It will be understood, however, that some form of a female mold cavity is an indispensable component of the system 10 according to the present invention.

Figure 2A:
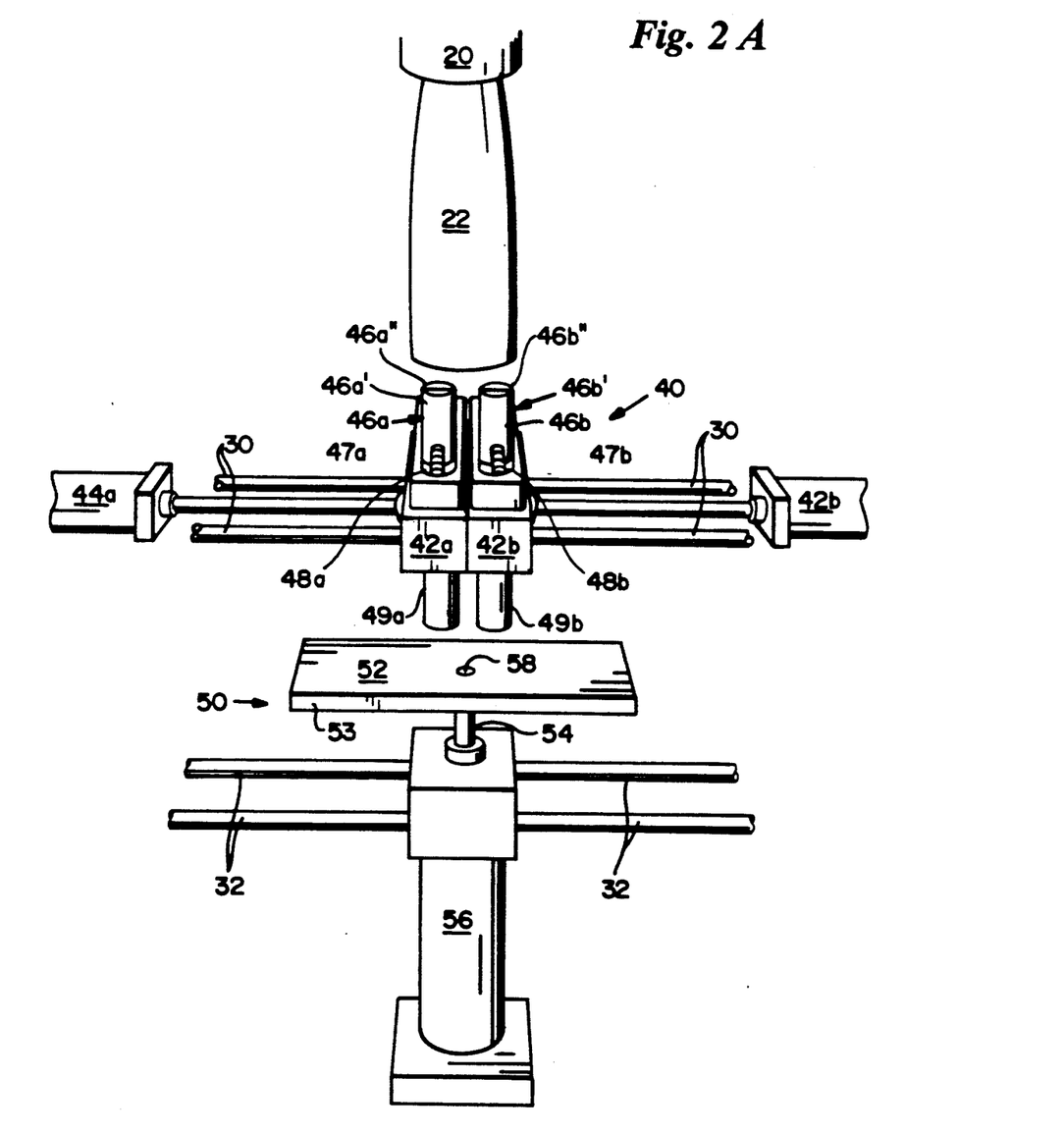
FIGS. 2A through 2E collectively depict the operational sequence of the blow-molding apparatus as shown in FIG. 1.

As is shown particularly in FIG. 2A, a typical blow-molding operation cycle begins with the the housing blocks in a closely adjacent position. At this point in the blow-molding cycle, the blow pin assembly 50 is in its lowered position and the split pin assemblies 46a, 46b are extended above the upper surface of their respective housing blocks 42a, 42b. It will also be observed in FIG. 2A that each of the split pin assemblies 46a, 46b is comprised of pin halves 46a', 46a'' and 46b', 46b'', respectively, that are movable towards and away from one another within the elongate opening 48a, 48b formed in each of the housing blocks 46a, 46b. The axes of each openings 48a, 48b are preferably oriented so as to be essentially transverse to the movement direction of the housing blocks 42a, 42b (i.e., transverse to the movement directions of arrows 28—see FIG. 1).

Figure 2B:
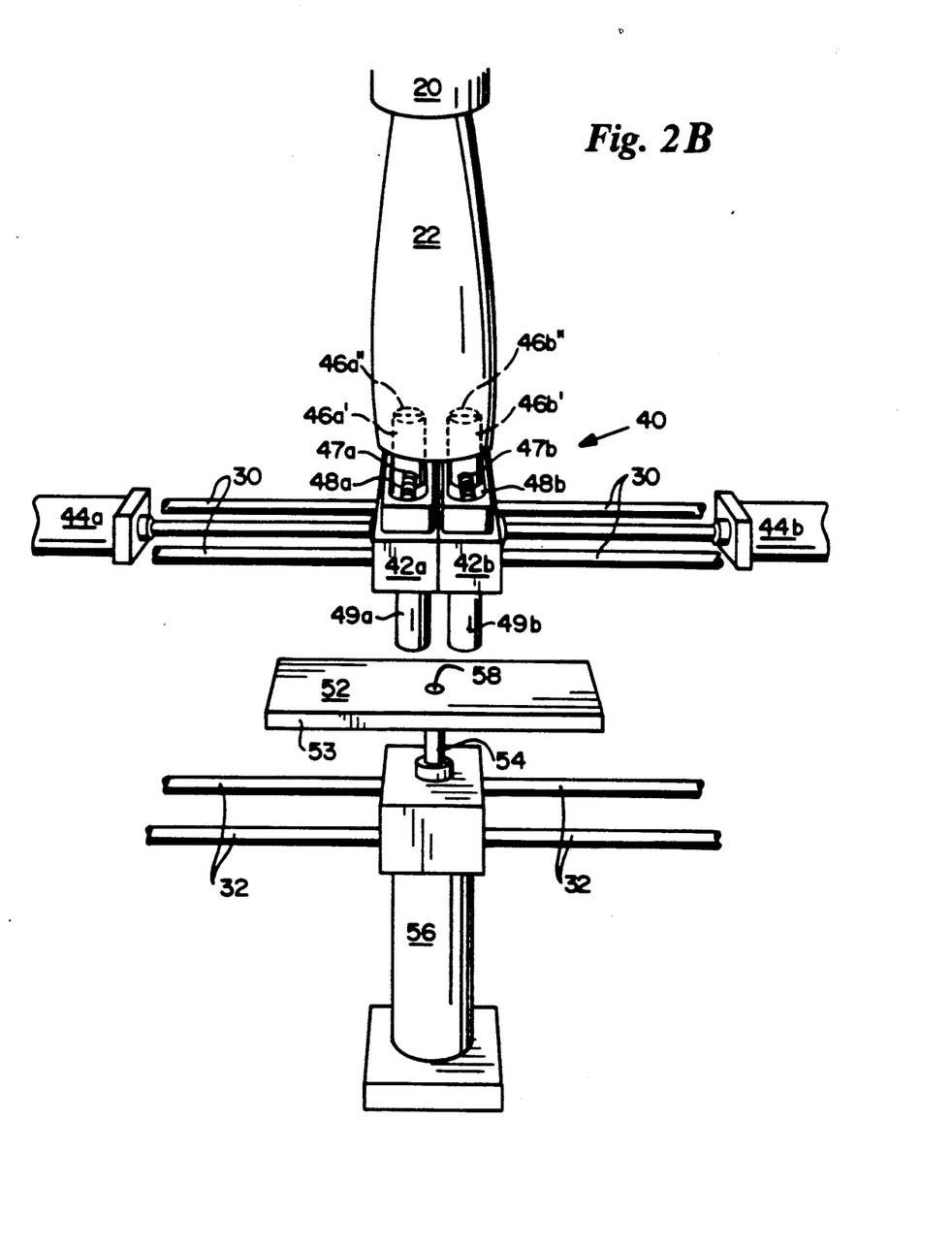
Figure 2C:
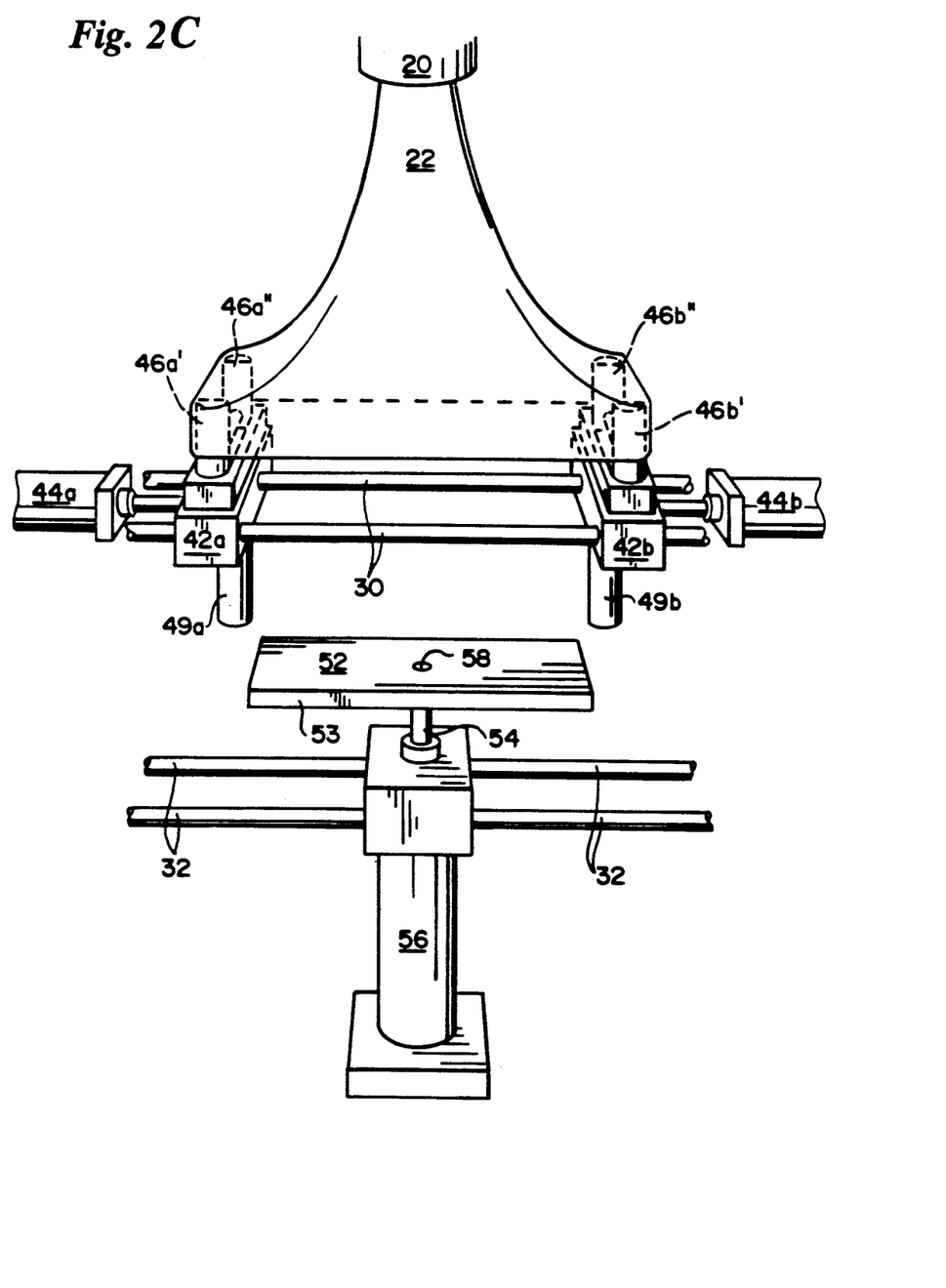

The split pin portions 46a', 46a" are threadably coupled to respective actuator rods 47a, 47b which are oriented essentially transverse to the movement direction of the housing blocks 42a, 42b along guides 30. Movements of the split pin portions 46a', 46a" and 46b', 46b" within the openings 48a, 48b from their initial position (as shown in FIG. 2A) to a final position (wherein the pin portions are separated from one another—as shown in FIG. 2C, for example) are thus effected by rotating these threaded actuator rods 47a, 47b in a desired direction about their longitudinal axis. The actuator rods 47a, 47b are most preferably rotated by means of respective reversible motors 49a, 49b.

The parison 22 will continually be increasing in axial length during that part of the blow-molding cycle shown in FIGS. 2A since molten thermoplastic material will continually be extruded through the die 20. Continued extrusion of the thermoplastic material is allowed until the open end of the parison 22 bounds the extended split pin assemblies 46a, 46b, at which time extrusion of the thermoplastic material through the die 20 is terminated. Such a state is shown in FIG. 2B.

As is shown in FIG. 2C, the housing blocks 42a, 42b are laterally separated from one another along the guides 30 which causes the open end of the parison to be stretched in that movement direction due to the pin assemblies 46a, 46b being moved therewith. The split pin assemblies 46a, 46b are also operated during this portion of the blow-molding cycle such that the respective split pin portions 46a', 46a" and 46b', 46b" are each moved relative to one another within openings 48a, 48b. The open end of the parison 22 is thereby also stretched in the direction of movement of the respective split pin portions 46a', 46a" and 46b', 46b" (i.e., in a direction essentially transverse to the movement direction of the housing blocks 42a, 42b along guides 30).

Figure 2D:
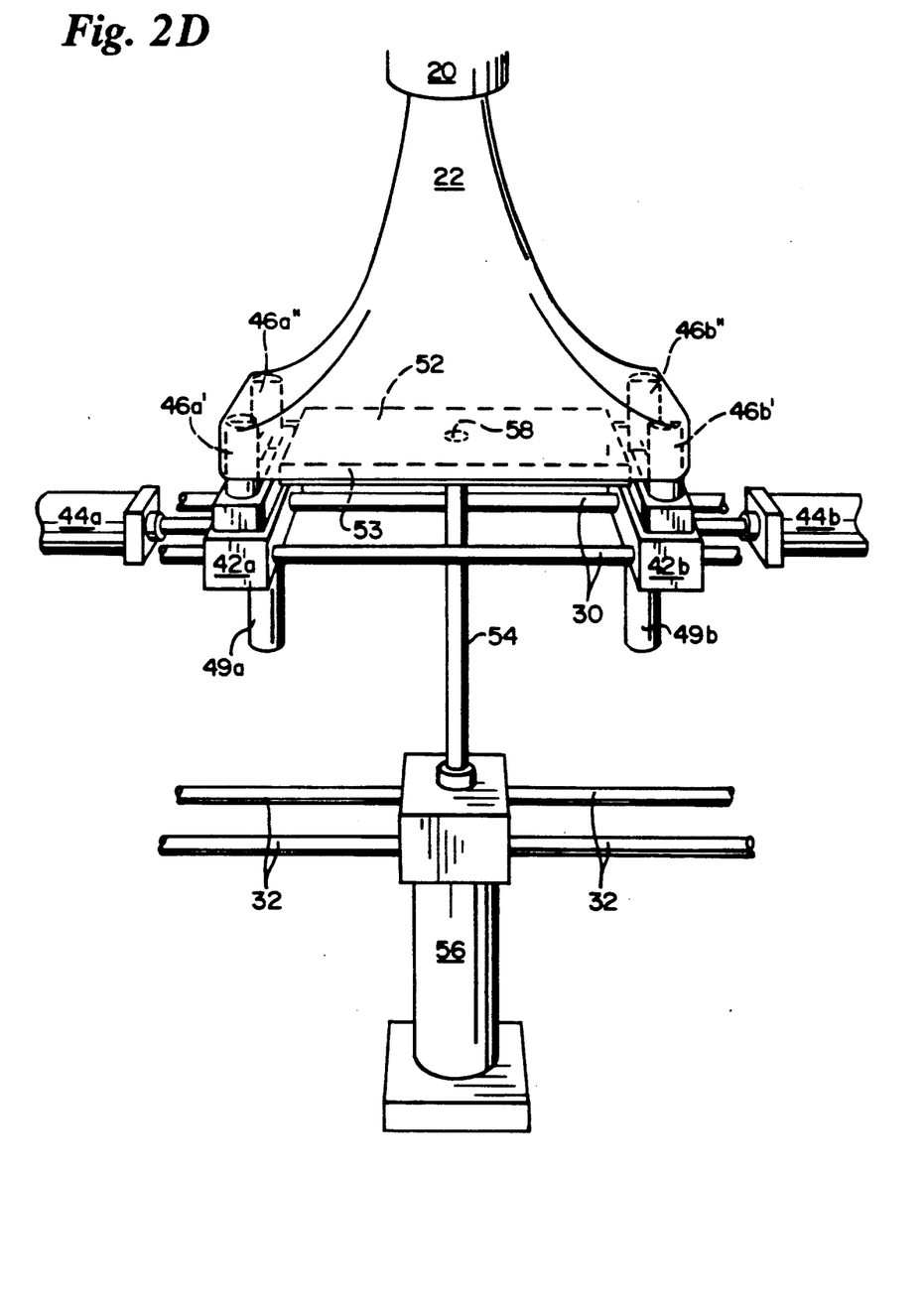
Figure 2E:
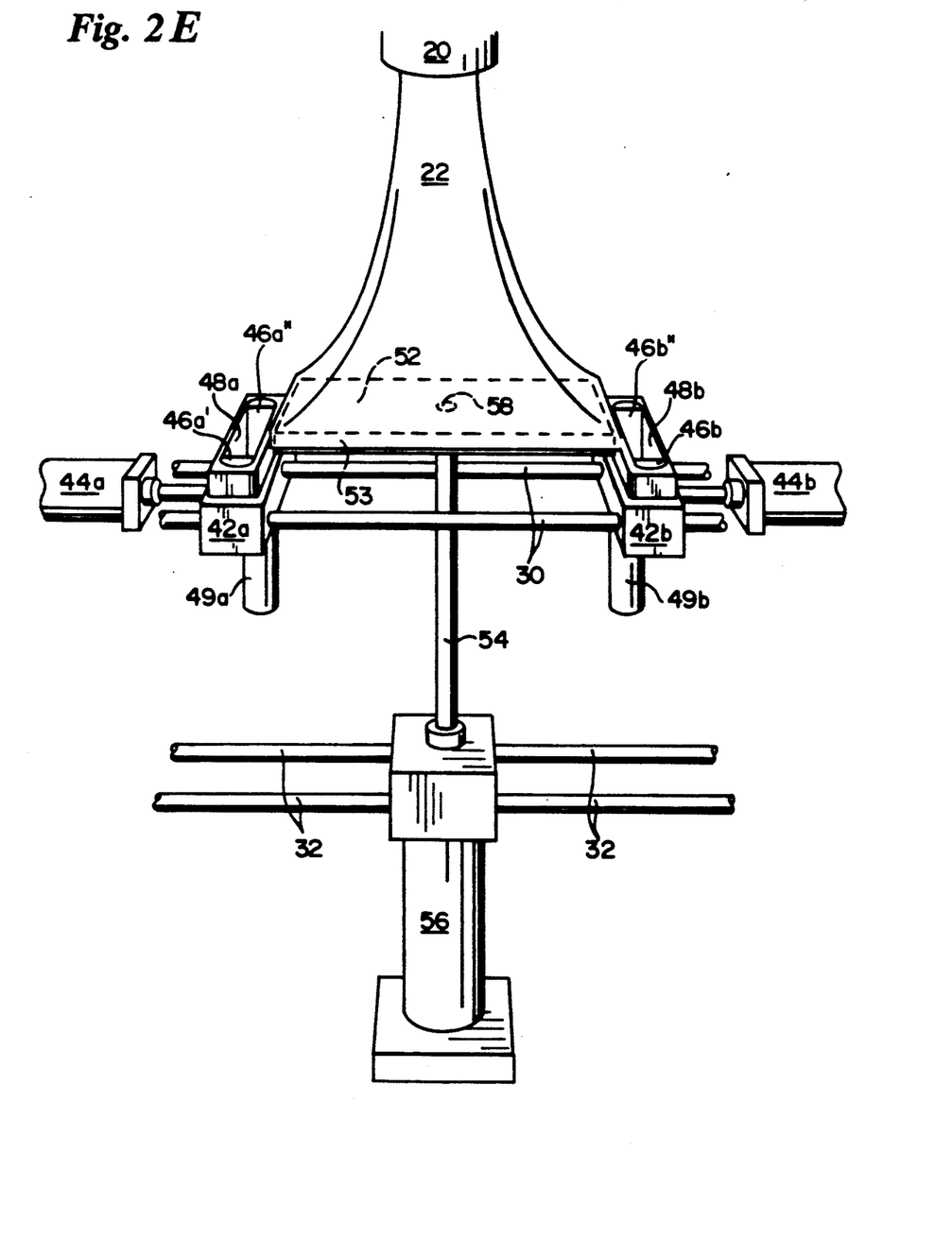

The result of the movements described above is that the open end of the parison 22 is dimensionally expanded to a significantly larger dimension as compared to the parison's nominal (as extruded) cross-sectional diameter. It will also be noted that the cross-sectional geometry of the parison's open end is essentially rectangular so as to accomodate the blow pin assembly 50. That is, as shown in FIG. 2D, the blow pin plate 52 is extended into the now dimensionally enlarged parison open end. Thus, the stretching movements described previously are such that the parison open end is dimensionally expanded to accomodate the dimension and geometry of the peripheral edge surface 53 of the blow pin plate 52.

With the blow pin plate 52 extended and positioned within the dimensionally expanded open end of parison 22, the split pin assemblies 46a and 46b are retracted within their respective openings 48a and 48b by any suitable motive means (not shown) thereby releasing the parison open end. The parison open end will thereby contracts somewhat under its own weight and will be draped against the peripheral edges surface 43 of the blow pin plate 52 as shown in accompanying FIGS. 2E. At this stage of the blow molding cycle, the mold cavity halves 24a and 24b (not shown in FIG. 2E, but see FIG. 1) are then moved into enveloping relationship with the parison 22 so that the parison is sealingly pinched at its open end between the mold cavity halves 24a, 24b and the peripheral edge surface 53 of the blow pin plate 52. It will thus be understood that the blow pin plate 52 will be housed within the mold halves 24a and 24b and will thus form a bottom wall of the female mold cavities 26a and 26b defined thereby. Thus, the mold halves 24a and 24b must be configured so as to accomodate the blow pin plate 52 when the former are closed.

Pressurized fluid is thus introduced into the parison 22 with the mold halves 24a and 24b closed so as to urge the parison into conformance with the female cavities 26a, 26b. Upon cooling, the blow-molded parison will be in the form of a hollow plastics article which retains the shape of the female mold cavities 26a, 26b. In addition, the blow-molded article that is produced will have a relatively large-sized opening that is defined by the peripheral edge surface 53 of the blow pin plate 52. It will therefore be apparent that material does not necessarily need to be removed from the blow-molded article in order to form an opening thereinto. The mold halves 24a and 24b may thus be parted and the the formed article removed when it has cooled to a sufficient degree. At that time, the blow molding cycle described previously may be repeated.

It should now be apparent that a variety of geometrical configurations of both the article's body and its opening may be provided by simply changing the molds 24a, 24b and/or the blow pin plate 50. That is, although the present invention has been described in terms of a rectangular opening, other geometric configurations are possible according to the present invention.

Thus, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blow-molding apparatus for fabricating a hollow article from an open-ended tubular body of thermoplastic material comprising:

a blow pin plate having a peripheral edge surface of preselected dimension and geometry, and an opening through which pressurized fluid may be discharged;

expanding means for dimensionally expanding said open end of said tubular body to an extent sufficient to accomodate said peripheral edge surface of said blow pin plate;

means for positioning said blow pin plate within said dimensionally expanded open end of said tubular body; and means for introducing said pressurized fluid into said tubular body through said opening in said blow pin plate, whereby said tubular body is caused to conform to a female mold cavity to thereby form said hollow article.

2. An apparatus as in claim 1, further comprising stretching means for stretching, and thereby dimensionally expanding, said open end of said tubular body, and means causing release of said dimensionally expanded open end of said tubular body subsequent to positioning of said blow pin plate therewithin so as to allow the open end to dimensionally contract and thereby come into contact with said peripheral edge surface of said blow pin plate.

3. An apparatus as in claim 2, wherein said stretching means includes means for stretching said open end in at least two different directions.

4. An apparatus as in claim 1, 2 or 3 further comprising sealing means for sealingly pinching said dimensionally expanded open end of said tubular body between said sealing structure and said peripheral edge surface of said blow pin plate.

5. A blow-molding apparatus for forming hollow articles from an open-ended tubular body of thermoplastics material comprising:
   a stretching assembly for stretching, and thereby dimensionally expanding, the open end of said tubular body;
   a blow pin assembly having an outer periphery being sized and configured to be accommodated within said dimensionally expanded open end of said tubular body;
   a drive assembly for moving said blow pin assembly into said dimensionally expanded open end of said tubular body so that said open end of said tubular body bounds said periphery of said blow pin assembly whereby said open end is closed by way of said blow pin assembly; and
   a mold assembly defining a mold cavity which is movable into enveloping relationship with said tubular body as as to seal said open end of said tubular body against said periphery of said blow pin assembly, whereby a pressurized fluid may be introduced into said tubular body and said open end may be maintained in said dimensionally expanded state.

6. An apparatus as in claim 5, wherein said stretching assembly includes a biaxial stretching assembly for stretching said open end of said tubular body along at least two different stretching directions.

7. An apparatus as in claim 6, wherein said biaxial stretching assembly includes:
   a pair of housing blocks reciprocally movable relative to one another between lesser and greater spaced positions; and
   a pair of split pin assemblies associated with a respective one of said housing blocks.

8. An apparatus as in claim 7, wherein said split pin assemblies each include first and second pin portions that are reciprocally movable relative to one another between (i) an initial position wherein the first and second pin portions are closely adjacent one another, and (ii) a final position wherein said first and second pin portions are separated from one another.

9. An apparatus as in claim 8, wherein said reciprocal movements of said housing blocks occur in a first axial direction, and said relative movements of each of said pin portions occurs in a second axial direction that is different from said first axial direction.

10. An apparatus as in claim 9, wherein each said split pin assemblies includes an actuator rod threadably coupled to said first and second pin portions, and motive means for rotating said actuator rod to cause said pin portions to move between said initial and final positions thereof.

11. An apparatus as in claim 10, wherein each said pin assembly is also mounted in said respective housing block for movements between an advanced and a retracted position.

12. An apparatus as in claim 5, further comprising an extrudar for continually extruding said tubular body.

13. An apparatus as in claim 12, wherein said extruder includes a circular extrusion die of controllably variable dimension.

14. A blow-molding apparatus for forming hollow articles from a tubular open-ended body of thermoplastics material, said apparatus comprising:
   a blow pin assembly having a blow pin plate which defines a peripheral surface of preselected dimension and geometry which is insertable within a dimensionally expanded open end of said tubular body;
   an expanding assembly for dimensionally expanding said open end of said tubular body, and for releasing said dimensionally expanded open end of said tubular body to allow said open end to dimensionally contract and thereby contact said peripheral surface of said blow pin plate, whereby said blow pin plate closes said dimensionally expanded open end of said tubular body; and
   a mold defining a female mold cavity for enveloping said tubular body when said blow pin plate is inserted within said dimensionally expanded open end thereof; and
   a fluid pressure introducing system for introducing a fluid under pressure through said blow pin plate and into said tubular body to cause said tubular body to conform to said female mold cavity.

15. An apparatus as in claim 14, wherein said expanding assembly includes a pair of reciprocally movable housing blocks each carrying a respective split pin assembly.

16. An apparatus as in claim 15, wherein said split pin assemblies are movable between an ex tended position wherein said open end of said tubular body may be engaged thereby, and a retracted position wherein said split pin assemblies release said open end of said tubular body.

17. An apparatus as in claim 16, wherein split pin assemblies each include a pair of pin portions movable with respect to one another between an initial position wherein said pin portions are closely adjacent one another, and a final position wherein the pin portions are separated from one another.

* * * * *